(12) United States Patent
Yu et al.

(10) Patent No.: US 9,882,239 B2
(45) Date of Patent: Jan. 30, 2018

(54) COMPOSITION FOR GEL POLYMER ELECTROLYTE AND LITHIUM SECONDARY BATTERY INCLUDING THE SAME

(71) Applicant: LG Chem, Ltd., Seoul (KR)

(72) Inventors: Sung Hoon Yu, Daejeon (KR); Doo Kyung Yang, Daejeon (KR); Sun Sik Shin, Daejeon (KR); Song Taek Oh, Daejeon (KR); Yoo Sun Kang, Daejeon (KR); Kyung Mi Lee, Daejeon (KR); Jin Hyun Park, Daejeon (KR); Jung Don Suk, Daejoen (KR)

(73) Assignee: LG Chem, Ltd. (KR)

( * ) Notice: Subject to any disclaimer, the term of this patent is extended or adjusted under 35 U.S.C. 154(b) by 243 days.

(21) Appl. No.: 14/248,448

(22) Filed: Apr. 9, 2014

(65) Prior Publication Data
US 2014/0220427 A1    Aug. 7, 2014

Related U.S. Application Data

(63) Continuation of application No. PCT/KR2014/000793, filed on Jan. 28, 2014.

(30) Foreign Application Priority Data

Jan. 28, 2013 (KR) .................. 10-2013-0009334
Jan. 28, 2013 (KR) .................. 10-2013-0009337
Jan. 27, 2014 (KR) .................. 10-2014-0009648

(51) Int. Cl.
*H01M 10/0565* (2010.01)
*H01M 10/052* (2010.01)
(Continued)

(52) U.S. Cl.
CPC ......... *H01M 10/0565* (2013.01); *C08L 33/18* (2013.01); *H01M 10/052* (2013.01);
(Continued)

(58) Field of Classification Search
None
See application file for complete search history.

(56) References Cited

U.S. PATENT DOCUMENTS 6,420,072 B1    7/2002   Maruyama et al.
8,232,008 B2    7/2012   Morishima et al.
(Continued)

FOREIGN PATENT DOCUMENTS

CN     1423364 A     6/2003
CN     101340009 A   1/2009
(Continued)

OTHER PUBLICATIONS

Machine Translation WO212176575.*
(Continued)

*Primary Examiner* — Miriam Stagg
*Assistant Examiner* — Victoria Lynch
(74) *Attorney, Agent, or Firm* — Lerner, David, Littenberg, Krumholz & Mentlik, LLP (57) ABSTRACT

Provided are a composition for a gel polymer electrolyte including i) an electrolyte solution solvent, ii) an ionizable lithium salt, iii) a polymerization initiator, and iv) a monomer having a functional group bondable to metal ions, and a lithium secondary battery including the composition for a gel polymer electrolyte.
In a case where the composition for a gel polymer electrolyte of the present invention is used in a lithium secondary battery, since the movement of metal ions dissolved from a cathode to an anode may be prevented or the precipitation of metal on the anode may be reduced, the lifetime of the
(Continued)

<GENERAL ELECTROLYTE SOLUTION>

<GEL POLYMER ELECTROLYTE> battery may not only be improved but capacity characteristics of the battery may also be excellent even in the case in which the battery is charged at a high voltage as well as normal voltage.

18 Claims, 3 Drawing Sheets (51) Int. Cl.
  *C08L 33/18* (2006.01)
  *H01M 4/505* (2010.01)
  *H01M 4/525* (2010.01)
(52) U.S. Cl.
  CPC ............ *H01M 4/505* (2013.01); *H01M 4/525* (2013.01); *H01M 2300/0085* (2013.01); *Y02E 60/122* (2013.01)

(56) References Cited

U.S. PATENT DOCUMENTS

| | | | |
|---|---|---|---|
| 2002/0034690 A1* | 3/2002 | Ono | C09K 19/00 429/306 |
| 2002/0114997 A1 | 8/2002 | Lee et al. | |
| 2003/0138703 A1 | 7/2003 | Yamaguchi et al. | |
| 2005/0231785 A1 | 10/2005 | Oh et al. | |
| 2005/0271939 A1 | 12/2005 | Xu et al. | |
| 2007/0037062 A1 | 2/2007 | Yamaguchi et al. | |
| 2007/0099090 A1 | 5/2007 | Oh et al. | |
| 2007/0212613 A1* | 9/2007 | Ishida | C08J 3/20 429/303 |
| 2009/0029256 A1 | 1/2009 | Mah et al. | |
| 2009/0061324 A1 | 3/2009 | Yamaguchi et al. | |
| 2009/0169976 A1 | 7/2009 | Takahashi | |
| 2011/0129738 A1 | 6/2011 | Kawashima | |
| 2011/0256456 A1 | 10/2011 | Jeon et al. | |
| 2012/0060360 A1 | 3/2012 | Liu | |
| 2012/0321911 A1 | 12/2012 | Watanabe et al. | |
| 2014/0106236 A1 | 4/2014 | Kwon et al. | |
| 2016/0028113 A1 | 1/2016 | Jeon et al. | |

FOREIGN PATENT DOCUMENTS

| | | | |
|---|---|---|---|
| CN | 101353435 A | 1/2009 | |
| CN | 101609891 A | 12/2009 | |
| CN | 101685876 A | 3/2010 | |
| CN | 101774563 A | 7/2010 | |
| CN | 101826635 A | 9/2010 | |
| CN | 101872875 A | 10/2010 | |
| CN | 102460787 A | 5/2012 | |
| CN | 102574697 A | 7/2012 | |
| CN | 102891010 A | 1/2013 | |
| EP | 1098382 A2 | 5/2001 | |
| EP | 2447216 A2 | 5/2012 | |
| JP | H11121012 A | 4/1999 | |
| JP | 2000021449 A | 1/2000 | |
| JP | 2000268871 A | 9/2000 | |
| JP | 2000-294284 A | 10/2000 | |
| JP | 2000311715 A | 11/2000 | |
| JP | 2000331533 A | 11/2000 | |
| JP | 2001176556 A | 6/2001 | |
| JP | 2002289255 A | 10/2002 | |
| JP | 2003168479 A | 6/2003 | |
| JP | 2007287630 A | 11/2007 | |
| JP | 2009163936 A | 7/2009 | |
| JP | 2010514134 A | 4/2010 | |
| JP | 2011119097 A | 6/2011 | |
| JP | WO 2012176575 A1 * | 12/2012 | ........... C07D 403/14 |
| KR | 20040084117 A | 10/2004 | |
| KR | 2006-0045803 A | 5/2006 | |
| KR | 2007-0063772 A | 6/2007 | |
| KR | 2008-0058197 A | 6/2008 | |
| KR | 20090011888 A | 2/2009 | |
| WO | 2013002504 A2 | 1/2013 | |

OTHER PUBLICATIONS

Search Report from European Application No. 14728802.1 dated Dec. 9, 2014.
International Search Report from PCT/KR2014/000793 dated May 13, 2014.
Du Ke, et al., "Effects from Feeding Ways during Preparing Li[Li0.2Co0.13Ni0.13Mn0.54]O2 by Carbonate Co-precipitation Method." Chinese Journal of Inorganic Chemistry, Jan. 2012, vol. 28, No. 1, pp. 74-78. (English translation of Abstract only).
International Search Report from PCT/KR2014/000800, dated May 13, 2014.
Search Report from European Application No. 14728801.3 dated Dec. 9, 2014.
Search Report from Chinese Application No. 2014800012219 dated Oct. 8, 2016.
Search Report from Chinese Application No. 2014800012219 dated Apr. 5, 2017.
U.S. Appl. No. 14/247,679, filed Apr. 8, 2014.

* cited by examiner

COMPOSITION FOR GEL POLYMER ELECTROLYTE AND LITHIUM SECONDARY BATTERY INCLUDING THE SAME

CROSS-REFERENCE TO RELATED APPLICATIONS

The present application is a continuation of International Application No. PCT/KR2014/000793 filed on Jan. 28, 2014, which claims the benefit of Korean Patent Application No. 10-2014-0009648, filed on Jan. 27, 2014, Korean Patent Application No. 10-2013-0009337, filed on Jan. 28, 2013, and Korean Patent Application No. 10-2013-0009334, filed Jan. 28, 2013 the disclosures of which are incorporated herein by reference.

TECHNICAL FIELD

The present invention relates to a composition for a gel polymer electrolyte and a lithium secondary battery including the same, and more particularly, to a composition for a gel polymer electrolyte including a monomer having a functional group bondable to metal ions that are dissolved from a cathode, and a lithium secondary battery including the composition.

BACKGROUND ART

The application area of chargeable and dischargeable secondary batteries is being increasingly expanded to electric vehicles as well as portable devices such as mobile phones, notebooks, and camcorders. Accordingly, secondary batteries have been actively developed. Also, research and development of battery design to improve capacity density and specific energy have been conducted during the development of the secondary batteries.

In general, it is known that battery safety improves in the order of a liquid electrolyte, a gel polymer electrolyte, and a solid polymer electrolyte, but battery performance decreases in the same order. An electrolyte in a liquid state, particularly, an ion conductive organic liquid electrolyte, in which a salt is dissolved in a non-aqueous organic solvent, has been mainly used as an electrolyte for an electrochemical device, such as a typical battery using an electrochemical reaction and an electric double-layer capacitor. However, when the electrolyte in a liquid state is used, an electrode material may degrade and the organic solvent is likely to be volatilized. Also, there may be limitations in safety such as combustion due to ambient temperature and the temperature rise of the battery itself.

It is known that the solid polymer electrolyte has not been commercialized yet due to poor battery performance.

Since the gel polymer electrolyte may have excellent electrochemical safety, the thickness of the battery may be constantly maintained. Furthermore, since a contact between an electrode and the electrolyte may be excellent due to the inherent adhesion of a gel phase, a thin-film type battery may be prepared. Thus, the development of various gel polymer electrolytes is being expanded.

Figure 1:
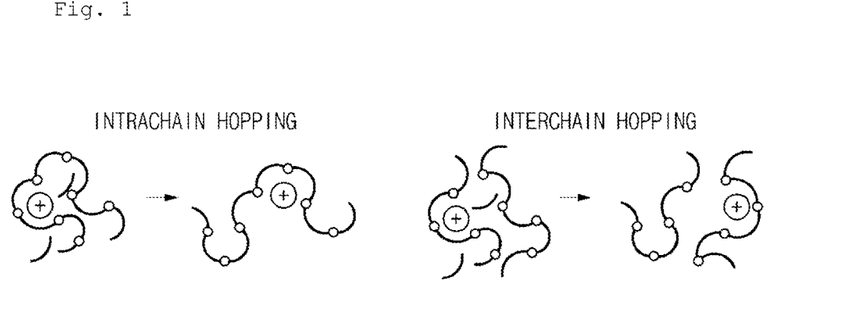
FIG. 1 illustrates a principle of the movement of lithium ions when a composition for a gel polymer electrolyte is used.

In the gel polymer electrolyte, since the size of lithium ions may be small, direct movement may not only be relatively easy, but also the lithium ions may easily move in the electrolyte solution due to a hopping phenomenon as illustrated in FIG. 1.

A lithium secondary battery including the gel polymer electrolyte generally uses a lithium transition metal oxide, such as $LiCoO_2$, as a cathode active material. However, when the lithium secondary battery is used at a high voltage, metal ions may be dissolved. When the metal ions are dissolved, the metal ions may be reduced to a metallic state in an anode to block reaction sites of the anode. When the new metal is precipitated on the surface of the anode, an electrolyte solution produces a new solid electrolyte interface (SEI) layer on the surface of the metal, and thus, the electrolyte solution is continuously consumed. Also, since the thickness of the SEI layer in the anode may be continuously increased to increase resistance, life characteristics of the lithium secondary battery may be decreased.

DISCLOSURE OF THE INVENTION

Technical Problem

The present invention provides a composition for a gel polymer electrolyte which may not only improve the lifetime of a battery, but may also improve capacity characteristics of the battery in both normal and high voltage ranges by preventing the movement or decreasing the movement speed of metal ions dissolved from a cathode to an anode to reduce the precipitation of metal on the anode, and a lithium secondary battery including the composition.

Technical Solution

According to an aspect of the present invention, there is provided a composition for a gel polymer electrolyte including i) an electrolyte solution solvent; ii) an ionizable lithium salt; iii) a polymerization initiator; and iv) a monomer having a functional group bondable to metal ions.

According to another aspect of the present invention, there is provided a lithium secondary battery including a cathode; an anode; a separator; and a gel polymer electrolyte, wherein the gel polymer electrolyte is formed by polymerizing the composition for a gel polymer electrolyte.

Advantageous Effects

A composition for a gel polymer electrolyte of the present invention includes a monomer having a functional group bondable to metal ions. Thus, when the composition is used in a lithium secondary battery, since the precipitation of metal on an anode may be reduced by preventing the movement or decreasing the movement speed of metal ions dissolved from a cathode to the anode, the lifetime of the battery may not only be improved but capacity characteristics of the battery may also be improved in both normal and high voltage ranges.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A composition for a gel polymer electrolyte according to an embodiment of the present invention may include an electrolyte solution solvent, an ionizable lithium salt, a polymerization initiator, and a monomer having a functional group bondable to metal ions.

The monomer having the functional group is acrylonitrile or an acrylate-based monomer, and preferably, the functional group may include any one selected from the group consisting of which are substituted or unsubstituted with $C_1$-$C_5$ alkyl or halogen, or a mixture of two or more thereof.

Typical examples of the monomer having the functional group according to an embodiment of the present invention may be any one selected from the group consisting of the following compounds or a mixture of two or more thereof:

(1) 2-cyanoethyl acrylate;

(2) 2-cyanoethoxyethyl acrylate;

(3) acrylonitrile;

(4) ethyl (E)-3-(pyridin-2-yl)-acrylate;

(5) ethyl (E)-3-(4-pyridinyl)-2-propenoate;

(6) 2-propenoic acid, 3,3'-[2,2'-bipyridine]-4,4'-diylbis-, dimethyl ester;

(7) 2-propenoic acid, 2-[2,2'-bipyridine]-6-ylethyl ester;
(8) 2-propenoic acid, 2-[2,2'-bipyridine]-5-ylethyl ester;
(9) 2-propenoic acid, 2-[2,2'-bipyridine]-4-ylethyl ester;
(10) 2-propenoic acid, 1,1'-[[2,2'-bipyridine]-4,4'-diylbis (methylene)]ester;
(11) 2-propenoic acid, 1,10-phenanthroline-2,9-diylbis (methylene)ester;
(12) 2-propenoic acid, 3-(1,10-phenanthroline-2-yl)-phenylmethyl ester; and
(13) 2-propenoic acid, 2-[[(1-oxo-2-propenyl)oxy]methyl]-2-[(1,10-phenanthroline-5-ylmethoxy)methyl]-1,3-propanediyl ester.

Among these compounds, any one selected from the group consisting of 2-cyanoethyl acrylate, 2-cyanoethoxyethyl acrylate, acrylonitrile, and ethyl (E)-3-(pyridin-2-yl)-acrylate, or a mixture of two or more thereof may be particularly used.

According to an embodiment of the present invention, since the monomer having the functional group includes the functional group in the monomer, the functional group may be stably fixed in a gel structure in the gel polymer electrolyte.

For example, in a case where a complex is formed by respectively adding a cyano group and acrylate to the composition for a gel polymer electrolyte (gel electrolyte solution) and polymerizing, the complex itself may move in the composition for a gel polymer electrolyte so that reduction may occur at an anode and metal may be precipitated.

However, according to an embodiment of the present invention, in a case where 2-cyanoethylacrylate is used as the monomer having the functional group, since a cyano group is included in the monomer having the functional group, the cyano group itself may not move in the gel structure.

Figure 2:
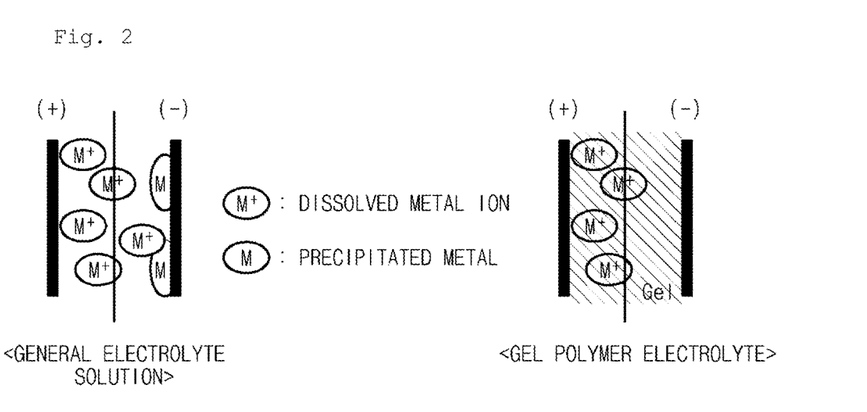
FIG. 2 compares degrees of precipitated metal on an anode according to the uses of a typical electrolyte solution and a composition for a gel polymer electrolyte according to an embodiment of the present invention.

That is, according to an embodiment of the present invention, as illustrated in FIG. 2, in a case where the monomer having the functional group is used in the composition for a gel polymer electrolyte, the monomer having the functional group may be bonded to metal ions dissolved from a cathode to reduce the precipitation of metal on an anode, different from a case of using a typical electrolyte solution in which metal ions dissolved from the cathode is precipitated on the anode. Thus, charge and discharge efficiency of a lithium secondary battery may be improved and good cycle characteristics may be exhibited. In addition, in a case where the composition for a gel polymer electrolyte including the monomer having the functional group is used in a lithium secondary battery, capacity characteristics may be improved in both normal and high voltage ranges.

The expression "normal voltage" used in the present specification denotes a case in which a charge voltage of the lithium secondary battery is in a range of 3.0 V to less than 4.3 V, and the expression "high voltage" denotes a case in which a charge voltage is in a range of 4.3 V to 5.0 V.

The monomer having the functional group may be included in an amount of 0.1 wt % to 10 wt %, for example, 0.5 wt % to 5 wt % based on a total weight of the composition for a gel polymer electrolyte. In the case that the amount of the monomer having the functional group is less than 0.1 wt %, gelation may be difficult and thus, characteristics of the gel polymer electrolyte may not be exhibited. In the case in which the amount of the monomer is greater than 10 wt %, resistance may increase due to the excessive amount of the monomer and thus, battery performance may decrease.

Also, according to an embodiment of the present invention, the composition for a gel polymer electrolyte may further include a monomer having 2 to 6 acrylate groups, and the monomer may be a branched monomer.

Examples of the branched monomer may be any one selected from the group consisting of ditrimethylolpropane tetraacrylate, dipentaerythritol pentaacrylate, and dipentaerythritol hexaacrylate, or a mixture of two or more thereof.

The branched monomer may be included in an amount of 0.1 wt % to 10 wt %, preferably, 0.5 wt % to 5 wt % based on the total weight of the composition for a gel polymer electrolyte.

According to an embodiment of the present invention, in a case where the composition for a gel polymer electrolyte further includes the branched monomer, the monomer having the functional group and the branched monomer are mixed and reacted at a temperature ranging from 30° C. to 100° C. for 2 minutes to 12 hours to prepare a polymerizable monomer. In this case, a content ratio(weight ratio) of the monomer having the functional group to the branched monomer, for example, may be in a range of 1:0.1 to 1:10. However, the present invention is not limited thereto.

Examples of the ionizable lithium salt included in the composition for a gel polymer electrolyte according to an embodiment of the present invention may be any one selected from the group consisting of $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$, and $LiC_4BO_8$, or a mixture of two or more thereof. However, the present invention is not limited thereto.

Also, any electrolyte solution solvent typically used in an electrolyte solution for a lithium secondary battery may be used as the electrolyte solution solvent used according to an embodiment of the present invention without limitation, and for example, ether, ester, amide, linear carbonate, or cyclic carbonate may be used alone or in a mixture of two or more thereof.

Among these materials, the cyclic carbonate, the linear carbonate, or a carbonate compound as a mixture thereof may be representatively included. Specific examples of the cyclic carbonate may be any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and a halide thereof, or a mixture of two or more thereof. Also, specific examples of the linear carbonate may be any one selected from the group consisting of dimethyl carbonate (DMC), diethyl carbonate (DEC), dipropyl carbonate (DPC), ethylmethyl carbonate (EMC), methylpropyl carbonate (MPC), and ethylpropyl carbonate (EPC), or a mixture of two or more thereof. However, the present invention is not limited thereto.

In particular, since ethylene carbonate and propylene carbonate, as cyclic carbonates among the carbonate-based electrolyte solution solvents, are highly viscous organic solvents and have high dielectric constants, the ethylene carbonate and propylene carbonate may well dissociate the lithium salt in the electrolyte solution. Thus, the ethylene carbonate and propylene carbonate may be used. Since an electrolyte solution having high electrical conductivity may be prepared when the above cyclic carbonate is mixed with low viscosity, low dielectric constant linear carbonate, such as ethylmethyl carbonate, diethyl carbonate, and dimethyl carbonate, in an appropriate ratio, the ethylene carbonate and propylene carbonate, preferably, may be used.

Also, as the ester among the electrolyte solution solvents, any one selected from the group consisting of methyl acetate, ethyl acetate, propyl acetate, methyl propionate, ethyl propionate, γ-butyrolactone, γ-valerolactone, γ-caprolactone, σ-valerolactone, and ε-caprolactone, or a mixture of two or more thereof may be used. However, the present invention is not limited thereto.

In the present invention, a typical polymerization initiator known in the art may be used as the polymerization initiator.

Non-limiting examples of the polymerization initiator may be organic peroxides or hydroperoxides, such as benzoyl peroxide, acetyl peroxide, dilauryl peroxide, di-tert-butyl peroxide, t-butyl peroxy-2-ethyl-hexanoate, cumyl hydroperoxide, and hydrogen peroxide, and azo compounds such as 2,2'-azobis(2-cyanobutane), 2,2'-azobis(methylbutyronitrile), 2,2'-azobis(iso-butyronitrile) (AIBN), and 2,2'-azobis(dimethylvaleronitrile) (AMVN). However, the present invention is not limited thereto.

The polymerization initiator may be dissociated by heat in the battery, for a non-limiting example, at a temperature of 30° C. to 100° C. or may be dissociated at room temperature (5° C. to 30° C.) to form a radical, and may be reacted with a polymerizable monomer by free radical polymerization to form a gel polymer electrolyte.

Also, the polymerization initiator may be used in an amount of 0.01 wt % to 2 wt % based on the total weight of the composition for a gel polymer electrolyte. In the case that the amount of the polymerization initiator used is greater than 2 wt %, the gelation may occur too quickly during the injection of the composition for a gel polymer electrolyte into the battery or the unreacted initiator may remain to adversely affect the battery performance afterwards. In contrast, in the case in which the amount of the polymerization initiator used is less than 0.01 wt %, the gelation may not be well performed.

The composition for a gel polymer electrolyte according to the embodiment of the present invention may selectively include other additives known in the art, in addition to the above-described components.

According to an embodiment of the present invention, provided is a lithium secondary battery including a cathode; an anode; a separator; and a gel polymer electrolyte, wherein the gel polymer electrolyte may be formed by polymerizing the composition for a gel polymer electrolyte. The gel polymer electrolyte according to an embodiment of the present invention is formed by polymerizing the composition for a gel polymer electrolyte according to a typical method known in the art. For example, the gel polymer electrolyte may be formed by in-situ polymerization of the composition for a gel polymer electrolyte in the secondary battery.

According to an exemplary embodiment of the present invention, the present invention may include (a) inserting an electrode assembly formed of a cathode, an anode, and a separator disposed between the cathode and the anode into a battery case, and (b) injecting a composition for a gel polymer electrolyte according to the present invention into the battery case and polymerizing the composition to form a gel polymer electrolyte.

An in-situ polymerization reaction in the lithium secondary battery may be performed by heat polymerization. In this case, polymerization time required may be in a range of about 2 minutes to 12 hours, and heat polymerization temperature may be in a range of 30° C. to 100° C.

When the gelation by the polymerization reaction is completed, a gel polymer electrolyte is formed. Specifically, a gel polymer is formed, in which polymerizable monomers are cross-linked each other by the polymerizaton reaction, and the gel polymer thus formed may be uniformly impregnated with a liquid electrolyte solution, in which an electrolyte salt is dissociated in an electrolyte solution solvent.

The lithium secondary battery according to an embodiment of the present invention has a charge voltage ranging from 3.0 V to 5.0 V, and thus, capacity characteristics of the lithium secondary battery may be excellent in both normal and high voltage ranges.

According to an embodiment of the present invention, an electrode of the lithium secondary battery may be prepared by a typical method known in the art. For example, a binder, a conductive agent, and a dispersant, if necessary, as well as a solvent are mixed with an electrode active material and stirred to prepare a slurry, and a metal current collector is then coated with the slurry and pressed. Thereafter, the electrode may be prepared by drying the metal current collector.

According to an embodiment of the present invention, any compound may be used as a cathode active material in the cathode without limitation as long as it may be used at a normal voltage or high voltage and may reversibly intercalate/deintercalate lithium.

In the lithium secondary battery according to an embodiment of the present invention, the cathode active material usable at a normal voltage, for example, may include any one selected from the group consisting of $LiCoO_2$, $LiNiO_2$, $LiMnO_2$, $LiMn_2O_4$, $LiNi_{1-y}Co_yO_2$ ($0 \le y \le 1$), $LiCo_{1-y}MnO_2$ ($0 \le y < 1$), $LiNi_{1-y}Mn_yO_2$ ($0 \le y < 1$), and $Li(Ni_aCo_bMn_c)O_2$ ($0<a,b,c \le 1$, $a+b+c=1$), or a mixture of two or more thereof. However, the present invention is not limited thereto. Also, sulfide, selenide, and halide may be included in addition to the above oxides.

In a lithium secondary battery according to another embodiment of the present invention, the cathode active material usable at a high voltage may include any one selected from the group consisting of spinel lithium transition metal oxides having a hexagonal layered rock-salt structure with high capacity characteristics, an olivine structure, and a cubic structure, $V_2O_5$, TiS, and MoS, or a composite oxide of two or more thereof. Specifically, the cathode active material usable at a high voltage, for example, may include any one selected from the group consisting of compounds of Chemical Formulas 1 to 3, or a mixture of two or more thereof.

$Li[Li_xNi_aCo_bMn_c]O_2$      <Chemical Formula 1>

(where $0<x \le 0.3$, $0.3<c \le 0.7$, $0<a+b<0.5$, and $x+a+b+c=1$);

$LiMn_{2-x}M_xO_4$      <Chemical Formula 2>

(where M is one or more elements selected from the group consisting of nickel (Ni), cobalt (Co), iron (Fe), phosphorus (P), sulfur (S), zirconium (Zr), titanium (Ti), and aluminum (Al), and $0<x \le 2$);

$Li_{1+a}CO_xM_{1-x}AX_4$      <Chemical Formula 3>

(where M is one or more elements selected from the group consisting of Al, magnesium (Mg), Ni, Co, manganese (Mn), Ti, gallium (Ga), copper (Cu), vanadium (V), niobium (Nb), Zr, cerium (Ce), indium (In), zinc (Zn), and yttrium (Y), X is one or more elements selected from the group consisting of oxygen (O), fluorine (F), and nitrogen (N), A is P, S, or a mixed element thereof, $0 \le a \le 0.2$, and $0.5 \le x \le 1$).

The cathode active material may satisfy $0.4 \le c \le 0.7$ and $0.2 \le a+b<0.5$ in Chemical Formula 1, and may include any one selected from the group consisting of $LiNi_{0.5}Mn_{1.5}O_4$, $LiCoPO_4$, and $LiFePO_4$, or a mixture of two or more thereof.

In the lithium secondary battery according to an embodiment of the present invention, a carbon material, lithium metal, silicon, or tin, which may intercalate and deintercalate lithium ions, may be typically used as an anode active material. For example, the carbon material may be used and both low crystalline carbon and high crystalline carbon may be used as the carbon material. Representative examples of the low crystalline carbon may be soft carbon and hard carbon, and representative examples of the high crystalline carbon may be natural graphite, Kish graphite, pyrolytic carbon, mesophase pitch-based carbon fibers, meso-carbon microbeads, mesophase pitches, and high-temperature sintered carbon such as petroleum or coal tar pitch derived cokes.

A slurry is prepared by mixing and stirring the anode or the cathode active material, a binder, a solvent, and a conductive agent and a dispersant which may be typically used if necessary. Then, the anode or cathode may be prepared by coating a current collector with the slurry and pressing the coated current collector.

Various types of binder polymers, such as a polyvinylidene fluoride-hexafluoropropylene copolymer (PVDF-co-HEP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylate, an ethylene-propylene-diene monomer (EPDM), a sulfonated EPDM, a styrene-butadiene rubber (SBR), a fluorine rubber, and various copolymers, may be used as the binder.

A typical porous polymer film used as a typical separator, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Also, a typical porous nonwoven fabric, for example, a nonwoven fabric formed of high melting point glass fibers or polyethylene terephthalate fibers may be used. However, the separator is not limited thereto.

A shape of the lithium secondary battery according to an embodiment of the present invention is not particularly limited, and for example, a cylindrical type using a can, a prismatic type, a pouch type, or a coin type may be used.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present inventive concept to those skilled in the art.

EXAMPLES

Hereinafter, the present invention will be described in more detail, according to examples and experimental examples. However, the present invention is not limited thereto.

Example 1

<Preparation of Composition for Gel Polymer Electrolyte>

An electrolyte solution was prepared by dissolving $LiPF_6$ in a non-aqueous electrolyte solution solvent having a composition, in which a volume ratio of ethylene carbonate (EC) to ethylmethyl carbonate (EMC) was 1:2, to obtain a $LiPF_6$ concentration of 1 M. A composition for a gel polymer electrolyte was prepared by adding 5 parts by weight of a polymerizable monomer (2.5 parts by weight of 2-cyanoethyl acrylate and 2.5 parts by weight of ditrimetylolpropane tetraacrylate) and 0.25 parts by weight of t-butylperoxy-2-ethylhexanoate as a polymerization initiator based on 100 parts by weight of the electrolyte solution.

<Preparation of Coin-Type Secondary Battery>

Cathode Preparation

A cathode mixture slurry was prepared by adding 94 wt % of $LiCoO_2$ as a cathode active material, 3 wt % of carbon black as a conductive agent, and 3 wt % of polyvinylidene fluoride (PVdF) as a binder to N-methyl-2-pyrrolidone (NMP) as a solvent. An about 20 μm thick aluminum (Al) thin film as a cathode current collector was coated with the cathode mixture slurry and dried, and the Al thin film was then roll-pressed to prepare a cathode.

Anode Preparation

An anode mixture slurry was prepared by adding 96 wt % of carbon powder as an anode active material, 3 wt % of PVdF as a binder, and 1 wt % of carbon black as a conductive agent to NMP as a solvent. A 10 μm thick copper (Cu) thin film as an anode current collector was coated with the anode mixture slurry and dried, and the Cu thin film was then roll-pressed to prepare an anode.

Battery Preparation

A battery was assembled using the cathode, the anode, and a separator formed of three layers of polypropylene/polyethylene/polypropylene (PP/PE/PP), and the prepared composition for a gel polymer electrolyte was injected into the assembled battery. Then, a coin-type secondary battery was prepared by heating the assembled battery to 80° C. for 2 minutes to 30 minutes.

Example 2

A coin-type secondary battery was prepared in the same manner as in Example 1 except that 2-cyanoethoxyethyl acrylate was used instead of 2-cyanoethyl acrylate in the preparation of the composition for a gel polymer electrolyte of Example 1.

Example 3

A coin-type secondary battery was prepared in the same manner as in Example 1 except that acrylonitrile was used instead of 2-cyanoethyl acrylate in the preparation of the composition for a gel polymer electrolyte of Example 1.

Example 4

A coin-type secondary battery was prepared in the same manner as in Example 1 except that ethyl (E)-3-(pyridin-2-yl)-acrylate was used instead of 2-cyanoethyl acrylate in the preparation of the composition for a gel polymer electrolyte of Example 1.

Example 5

A coin-type secondary battery was prepared in the same manner as in Example 1 except that a mixture, in which $LiMn_2O_4$ and $Li(Ni_{0.33}Co_{0.33}Mn_{0.33})O_2$ was mixed at a weight ratio of 3:7, was used as a cathode active material in the preparation of the coin-type secondary battery of Example 1.

Example 6

A coin-type secondary battery was prepared in the same manner as in Example 1 except that 2-cyanoethoxyethyl acrylate was used instead of 2-cyanoethyl acrylate in the preparation of the composition for a gel polymer electrolyte of Example 1, and a mixture, in which $LiMn_2O_4$ and $Li(Ni_{0.33}Co_{0.33}Mn_{0.33})O_2$ was mixed at a weight ratio of 3:7, was used as a cathode active material in the preparation of a coin-type secondary battery.

Example 7

A coin-type secondary battery was prepared in the same manner as in Example 1 except that $Li[Li_{0.29}Ni_{0.14}Co_{0.11}Mn_{0.46}]O_2$ was used instead of $LiCoO_2$ as a cathode active material in the preparation of the cathode of Example 1.

Example 8

A coin-type secondary battery was prepared in the same manner as in Example 1 except that 2-cyanoethoxyethyl acrylate was used instead of 2-cyanoethyl acrylate in the preparation of the composition for a gel polymer electrolyte of Example 1, and $Li[Li_{0.29}Ni_{0.14}Co_{0.11}Mn_{0.46}]O_2$ was used instead of $LiCoO_2$ as a cathode active material in the preparation of a cathode.

Example 9

A coin-type secondary battery was prepared in the same manner as in Example 1 except that acrylonitrile was used instead of 2-cyanoethyl acrylate in the preparation of the composition for a gel polymer electrolyte of Example 1, and Li[Li$_{0.29}$Ni$_{0.14}$Co$_{0.11}$Mn$_{0.46}$]O$_2$ was used instead of LiCoO$_2$ as a cathode active material in the preparation of a cathode.

Example 10

A coin-type secondary battery was prepared in the same manner as in Example 1 except that ethyl (E)-3-(pyridin-2-yl)-acrylate was used instead of 2-cyanoethyl acrylate in the preparation of the composition for a gel polymer electrolyte of Example 1, and Li[Li$_{0.29}$Ni$_{0.14}$Co$_{0.11}$Mn$_{0.46}$]O$_2$ was used instead of LiCoO$_2$ as a cathode active material in the preparation of a cathode.

Comparative Example 1

A coin-type secondary battery was prepared in the same manner as in Example 1 except that a polymerizable monomer and a polymerization initiator were not used in the preparation of the composition for a gel polymer electrolyte of Example 1.

Comparative Example 2

A coin-type secondary battery was prepared in the same manner as in Example 1 except that 5 parts by weight of ditrimetylolpropane tetraacrylate was used alone instead of using 5 parts by weight of a polymerizable monomer prepared by mixing 2.5 parts by weight of 2-cyanoethyl acrylate and 2.5 parts by weight of ditrimetylolpropane tetraacrylate in the preparation of the composition for a gel polymer electrolyte of Example 1.

Comparative Example 3

A coin-type secondary battery was prepared in the same manner as in Example 1 except that 5 parts by weight of dipentaerythritol pentaacrylate was used alone instead of using 5 parts by weight of a polymerizable monomer prepared by mixing 2.5 parts by weight of 2-cyanoethyl acrylate and 2.5 parts by weight of ditrimetylolpropane tetraacrylate in the preparation of the composition for a gel polymer electrolyte of Example 1.

Comparative Example 4

A coin-type secondary battery was prepared in the same manner as in Example 5 except that a polymerizable monomer and a polymerization initiator were not used in the preparation of the composition for a gel polymer electrolyte of Example 5.

Comparative Example 5

A coin-type secondary battery was prepared in the same manner as in Example 5 except that 5 parts by weight of ditrimetylolpropane tetraacrylate was used alone instead of using 5 parts by weight of a polymerizable monomer prepared by mixing 2.5 parts by weight of 2-cyanoethyl acrylate and 2.5 parts by weight of ditrimetylolpropane tetraacrylate in the preparation of the composition for a gel polymer electrolyte of Example 5.

Comparative Example 6

A coin-type secondary battery was prepared in the same manner as in Example 7 except that a polymerizable monomer and a polymerization initiator were not used in the preparation of the composition for a gel polymer electrolyte of Example 7.

Comparative Example 7

A coin-type secondary battery was prepared in the same manner as in Example 7 except that 5 parts by weight of ditrimetylolpropane tetraacrylate was used alone instead of using 5 parts by weight of a polymerizable monomer prepared by mixing 2.5 parts by weight of 2-cyanoethyl acrylate and 2.5 parts by weight of ditrimetylolpropane tetraacrylate in the preparation of the composition for a gel polymer electrolyte of Example 7.

Comparative Example 8

A coin-type secondary battery was prepared in the same manner as in Example 7 except that 5 parts by weight of dipentaerythritol pentaacrylate was used alone instead of using 5 parts by weight of a polymerizable monomer prepared by mixing 2.5 parts by weight of 2-cyanoethyl acrylate and 2.5 parts by weight of ditrimetylolpropane tetraacrylate in the preparation of the composition for a gel polymer electrolyte of Example 7.

Experimental Example 1: Capacity Characteristics 1

The lithium secondary batteries (battery capacity: 5.5 mAh) prepared in Examples 1 to 4 and Comparative Examples to 3 were charged at a constant current of 0.7 C to a voltage of 4.2 V at 55° C. Thereafter, the lithium secondary batteries were charged at a constant voltage of 4.2 V and the charge was terminated when a charge current became 0.275 mA. After the batteries were left standing for 10 minutes, the batteries were discharged at a constant current of 0.5 C to a voltage of 3.0 V. The charge and discharge were repeated for 100 cycles and battery capacities were then measured. The results thereof are presented in FIG. 3.

Figure 3:
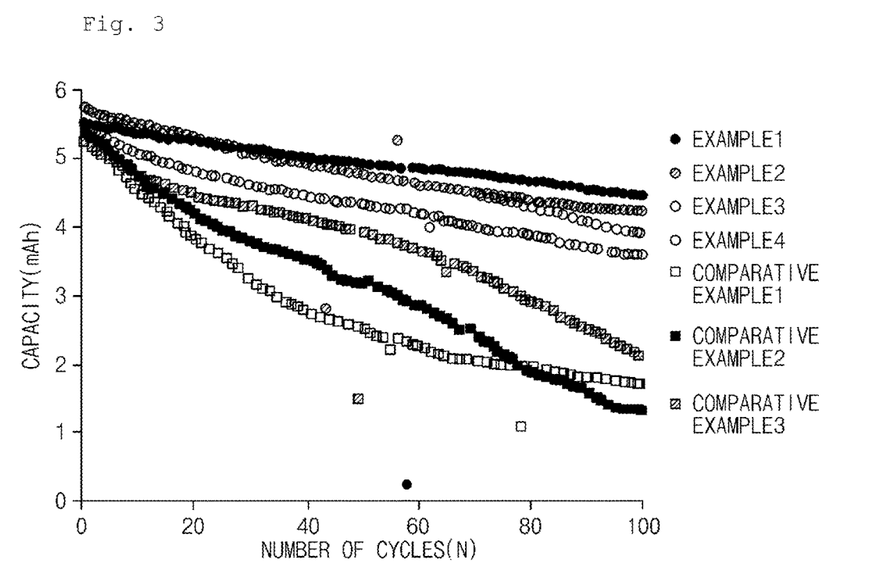
FIG. 3 is a graph illustrating capacity characteristics of lithium secondary batteries prepared in Examples 1 to 4 and Comparative Examples 1 to 3.

Specifically, as illustrated in FIG. 3, capacities of Examples 1 to 4 and Comparative Examples 1 to 3 were similar to one another within less than a 5$^{th}$ cycle. However, the capacities of Comparative Examples 1 to 3 were rapidly decreased after about a 20$^{th}$ cycle. In contrast, the capacities of Examples 1 to 4 were almost not changed to the 20$^{th}$ cycle. Also, with respect to Examples 1 to 4, slopes of the changes in capacity were relatively slow to a 100$^{th}$ cycle, and Examples 1 to 4 exhibited capacities that were 2 to 3 times or more those of Comparative Examples 1 to 3.

Therefore, it may be understood that the discharge capacities of the batteries prepared in Examples 1 to 4 after the 100$^{th}$ cycle were significantly improved in comparison to those of the batteries prepared in Comparative Examples 1 to 3.

Experimental Example 2: Capacity Characteristics 2

The lithium secondary batteries (battery capacity: 2.5 mAh) prepared in Examples 5 and 6 and Comparative Examples 4 and 5 were charged at a constant current of 0.7 C to a voltage of 4.2 V at 45° C. Thereafter, the lithium secondary batteries were charged at a constant voltage of 4.2 V and the charge was terminated when a charge current became 0.125 mA. After the batteries were left standing for 10 minutes, the batteries were discharged at a constant current of 0.5 C to a voltage of 3.0 V. The charge and discharge were repeated for 100 cycles and battery capacities were then measured. The results thereof are presented in FIG. 4.

Figure 4:
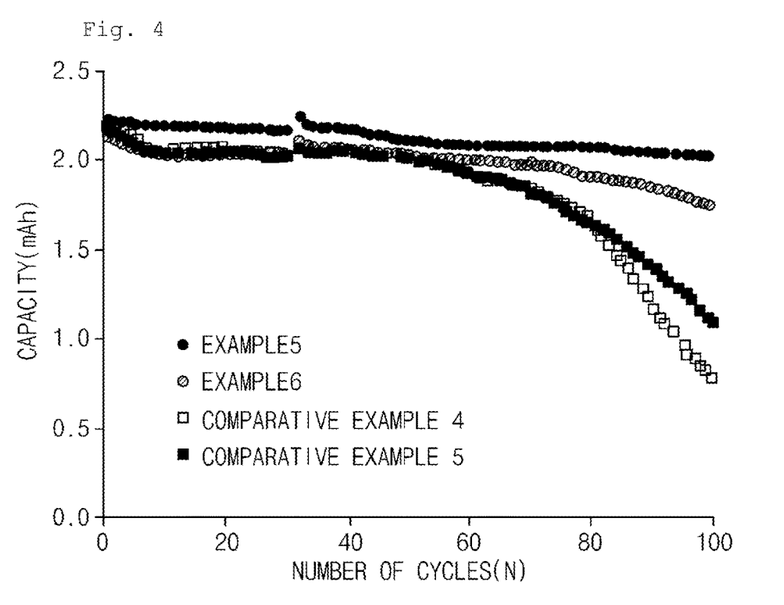
FIG. 4 is a graph illustrating capacity characteristics of lithium secondary batteries prepared in Examples 5 and 6 and Comparative Examples 4 and 5.

Specifically, as illustrated in FIG. 4, capacities of Examples 5 and 6 and Comparative Examples 4 and 5 were almost similar to one another within less than a $50^{th}$ cycle. However, the capacities of Comparative Examples 4 and 5 began to decrease after about a $60^{th}$ cycle and were rapidly decreased in an $80^{th}$ cycle. In contrast, with respect to Examples 5 and 6, slopes of the changes in capacity were almost maintained to a $100^{th}$ cycle, and in the $100^{th}$ cycle, Examples 5 and 6 exhibited capacities that were 2 to 3 times or more those of Comparative Examples 4 and 5.

Therefore, it may be understood that the discharge capacities of the batteries prepared in Examples 5 and 6 after the $100^{th}$ cycle were significantly improved in comparison to those of the batteries prepared in Comparative Examples 4 and 5.

Experimental Example 3: Capacity Characteristics 3 (High Voltage)

The lithium secondary batteries (battery capacity: 4.3 mAh) prepared in Examples 7 to 10 and Comparative Examples 6 to 8 were charged at a constant current of 0.7 C to a voltage of 4.3 V at 55° C. Thereafter, the lithium secondary batteries were charged at a constant voltage of 4.3 V and the charge was terminated when a charge current became 0.215 mA. After the batteries were left standing for 10 minutes, the batteries were discharged at a constant current of 0.5 C to a voltage of 3.0 V. The charge and discharge were repeated for 40 cycles and battery capacities were then measured. The results thereof are presented in FIG. 5.

Figure 5:
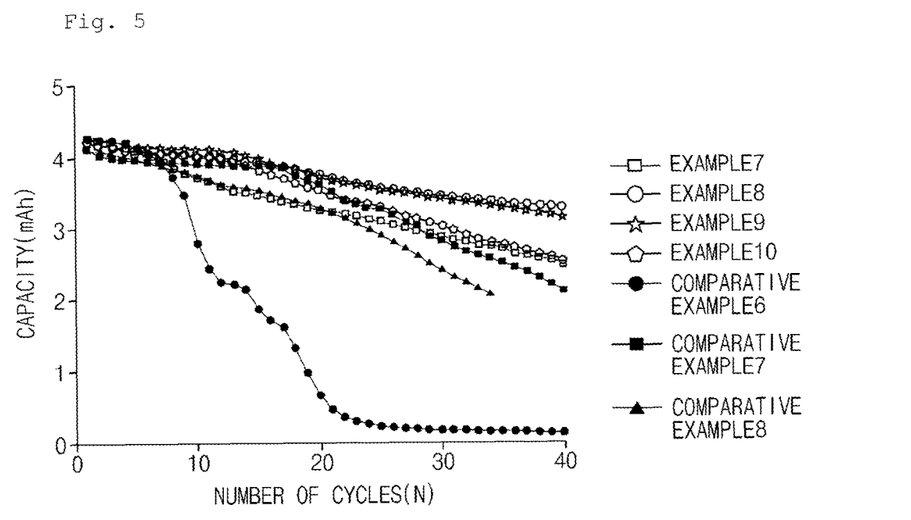
FIG. 5 is a graph illustrating capacity characteristics of lithium secondary batteries prepared in Examples 7 to 10 and Comparative Examples 6 to 8 at a high voltage of 4.3 V.

Specifically, referring to FIG. 5, capacities of Examples 7 to 10 and Comparative Examples 6 to 8 were similar to one another within less than about a $5^{th}$ cycle. However, the capacity of Comparative Example 6 was rapidly decreased after about the $5^{th}$ cycle, and the capacities of Comparative Examples 7 and 8 were rapidly decreased after a $30^{th}$ cycle and a $20^{th}$ cycle, respectively. In contrast, changes in the capacities of Examples 7 to 10 to a $40^{th}$ cycle were relatively lower than those of Comparative Examples 6 to 8. In particular, with respect to Examples 8 and 9 using 2-cyanoethoxyethyl acrylate and acrylonitrile, the capacities were almost not changed at a high voltage to the $40^{th}$ cycle, and Examples 8 to 9 exhibited capacities that were 2 to 4 times or more those of Comparative Examples 6 to 8.

Therefore, it may be understood that the discharge capacities of the batteries prepared in Examples 7 to 10 that were charged at a high voltage of 4.3 V after the $40^{th}$ cycle were significantly improved in comparison to those of the secondary batteries prepared in Comparative Examples 6 to 8.

INDUSTRIAL APPLICABILITY

In a case where a composition for a gel polymer electrolyte of the present invention is used in a lithium secondary battery, since the precipitation of metal on an anode may be reduced by preventing the movement or decreasing the movement speed of metal ions dissolved from a cathode to the anode, the lifetime of the battery may not only be improved but capacity characteristics of the battery may also be improved in both normal and high voltage ranges. Thus, the composition for a gel polymer electrolyte may be suitable for secondary batteries.

The invention claimed is:

1. A composition for a gel polymer electrolyte for a lithium secondary battery, the composition comprising:
   i) an electrolyte solution solvent;
   ii) an ionizable lithium salt;
   iii) a polymerization initiator; and
   iv) a monomer having a functional group bondable to metal ions,
wherein the monomer is an acrylate-based monomer having the functional group selected from the group consisting of which are substituted or unsubstituted with $C_1$-$C_5$ alkyl or halogen, and a mixture of two or more thereof.

2. The composition for a gel polymer electrolyte of claim 1, wherein the acrylate-based monomer having the functional group is any one selected from the group consisting of the following compounds and a mixture of two or more thereof:
   (1) ethyl (E)-3-(pyridin-2-yl)-acrylate;
   (2) ethyl (E)-3-(4-pyridinyl)-2-propenoate;
   (3) 2-propenoic acid, 3,3'-[2,2'-bipyridine]-4,4'-diylbis-, dimethyl ester;
   (4) 2-propenoic acid, 2-[2,2'-bipyridine]-6-ylethyl ester;
   (5) 2-propenoic acid, 2-[2,2'-bipyridine]-5-ylethyl ester;
   (6) 2-propenoic acid, 2-[2,2'-bipyridine]-4-ylethyl ester;
   (7) 2-propenoic acid, 1,1'-[[2,2'-bipyridine]-4,4'-diylbis (methylene)] ester;
   (8) 2-propenoic acid, 1,10-phenanthroline-2,9-diylbis (methylene) ester;
   (9) 2-propenoic acid, 3-(1,10-phenanthroline-2-yl)-phenylmethyl ester; and
   (10) 2-propenoic acid, 2-[[(1-oxo-2-propenyl)oxy] methyl]-2-[(1,10-phenanthroline-5-ylmethoxy) methyl]-1,3-propanediyl ester.

3. The composition for a gel polymer electrolyte of claim 1, further comprising a monomer having 2 to 6 acrylate groups,
   wherein the monomer is a branched monomer.

4. The composition for a gel polymer electrolyte of claim 3, wherein the branched monomer is any one selected from the group consisting of ditrimethylolpropane tetraacrylate, dipentaerythritol pentaacrylate, dipentaerythritol hexaacrylate, and a mixture of two or more thereof.

5. The composition for a gel polymer electrolyte of claim 1, wherein the monomer having the functional group is included in an amount of 0.1 wt % to 10 wt % based on a total weight of the composition.

6. The composition for a gel polymer electrolyte of claim 3, wherein the branched monomer is included in an amount of 0.1 wt % to 10 wt % based on the total weight of the composition.

7. The composition for a gel polymer electrolyte of claim 3, wherein a content ratio(weight ratio) of the monomer having the functional group to the branched monomer is in a range of 1:0.1 to 1:10.

8. The composition for a gel polymer electrolyte of claim 1, wherein the lithium salt is any one selected from the group consisting of $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$, $LiC_4BO_8$, and a mixture of two or more thereof.

9. The composition for a gel polymer electrolyte of claim 1, wherein the electrolyte solution solvent is linear carbonate, cyclic carbonate, or a combination thereof.

10. The composition for a gel polymer electrolyte of claim 9, wherein the linear carbonate comprises any one selected from the group consisting of dimethyl carbonate, diethyl carbonate, dipropyl carbonate, ethylmethyl carbonate, methylpropyl carbonate, and ethylpropyl carbonate, and a mixture of two or more thereof, and the cyclic carbonate comprises any one selected from the group consisting of ethylene carbonate, propylene carbonate, 1,2-butylene carbonate, 2,3-butylene carbonate, 1,2-pentylene carbonate, 2,3-pentylene carbonate, vinylene carbonate, a halide thereof, and a mixture of two or more thereof.

11. A lithium secondary battery comprising:
a cathode;
an anode;
a separator; and
a gel polymer electrolyte,
wherein the gel polymer electrolyte is formed by polymerizing the composition for a gel polymer electrolyte of claim 1.

12. The lithium secondary battery of claim 11, wherein the composition for a gel polymer electrolyte further comprises a monomer having 2 to 6 acrylate groups,
wherein the monomer is a branched monomer.

13. The lithium secondary battery of claim 12, wherein the branched monomer is any one selected from the group consisting of ditrimethylolpropane tetraacrylate, dipentaerythritol pentaacrylate, dipentaerythritol hexaacrylate, and a mixture of two or more thereof.

14. The lithium secondary battery of claim 11, wherein a charge voltage of the lithium secondary battery is in a range of 3.0 V to 5.0 V.

15. The lithium secondary battery of claim 14, wherein the charge voltage of the lithium secondary battery is in a range of 4.3 V to 5.0 V.

16. The lithium secondary battery of claim 15, wherein a cathode active material for the cathode is any one selected from the group consisting of compounds of Chemical Formulas 1 to 3, and a mixture of two or more thereof:

$$Li[Li_xNi_aCo_bMn_c]O_2 \qquad \text{<Chemical Formula 1>}$$

(where $0<x\leq0.3$, $0.3\leq c\leq0.7$, $0<a+b<0.5$, and $x+a+b+c=1$);

$$LiMn_{2-x}M_xO_4 \qquad \text{<Chemical Formula 2>}$$

(where M is one or more elements selected from the group consisting of nickel (Ni), cobalt (Co), iron (Fe), phosphorus (P), sulfur (S), zirconium (Zr), titanium (Ti), and aluminum (Al), and $0<x\leq2$);

$$Li_{1+a}Co_xM_{1-x}AX_4 \qquad \text{<Chemical Formula 3>}$$

(where M is one or more elements selected from the group consisting of Al, magnesium (Mg), Ni, Co, manganese (Mn), Ti, gallium (Ga), copper (Cu), vanadium (V), niobium (Nb), Zr, cerium (Ce), indium (In), zinc (Zn), and yttrium (Y), X is one or more elements selected from the group consisting of oxygen (O), fluorine (F), and nitrogen (N), A is P, S, or a mixed element thereof, $0\leq a\leq0.2$, and $0.5\leq x\leq1$).

17. The lithium secondary battery of claim 14, wherein a cathode active material for the cathode is any one selected from the group consisting of $LiCoO_2$, $LiNiO_2$, $LiMnO_2$, $LiMn_2O_4$, $LiNi_{1-y}Co_yO_2$ ($0\leq y<1$), $LiCo_{1-y}Mn_yO_2$ ($0\leq y<1$), $LiNi_{1-y}Mn_yO_2$ ($0\leq y<1$), $Li(Ni_aCo_bMn_c)O_2$ ($0<a,b,c\leq1$, $a+b+c=1$), and a mixture of two or more thereof.

18. A composition for a gel polymer electrolyte for a lithium secondary battery, the composition consisting of:
i) an electrolyte solution solvent;
ii) an ionizable lithium salt;
iii) a polymerization initiator; and
iv) a monomer having a functional group bondable to metal ions,
wherein the monomer is an acrylate-based monomer having the functional group selected from the group consisting of which are substituted or unsubstituted with $C_1$-$C_5$ alkyl or halogen, and a mixture of two or more thereof.

* * * * *